March 31, 1964   M. P. HUBBARD   3,127,215
INFANT'S SEAT AND BED
Filed Oct. 31, 1961   4 Sheets-Sheet 1

Mattie P. Hubbard
INVENTOR.

BY *Clarence A. O'Brien*
*and Harvey B. Jackson*
Attorneys

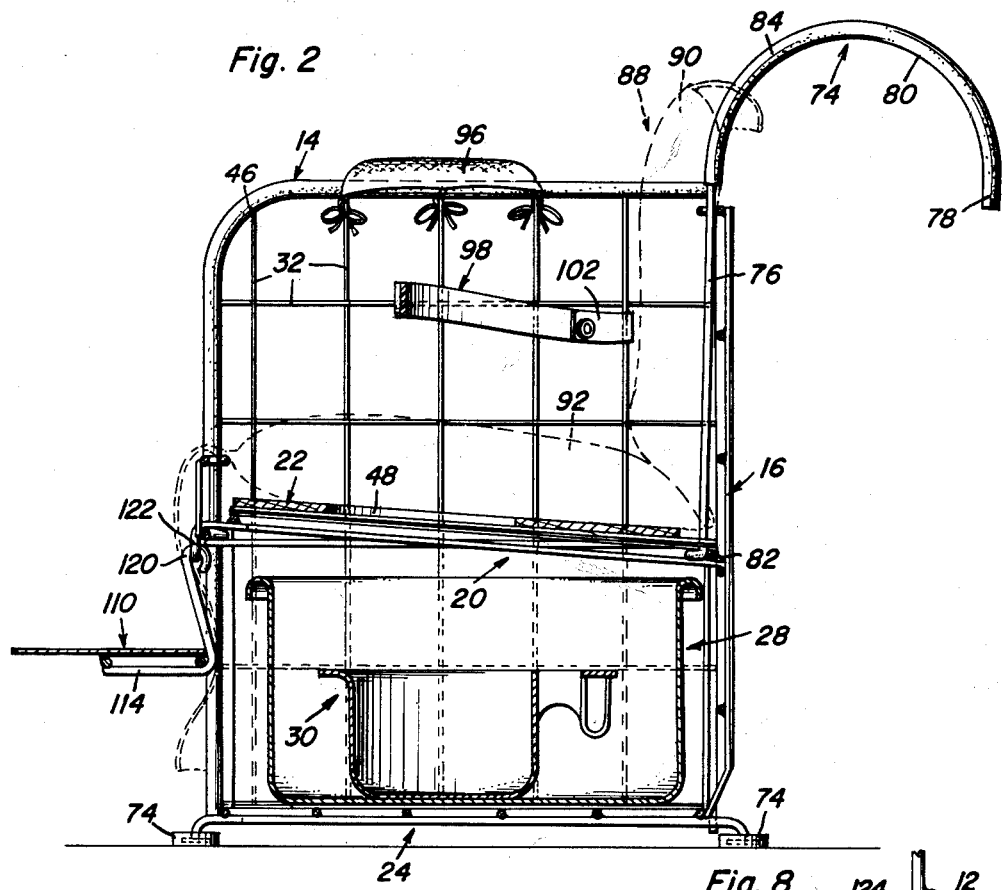
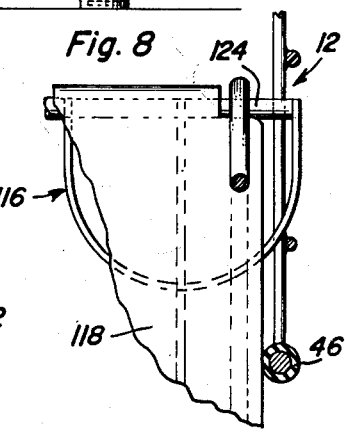
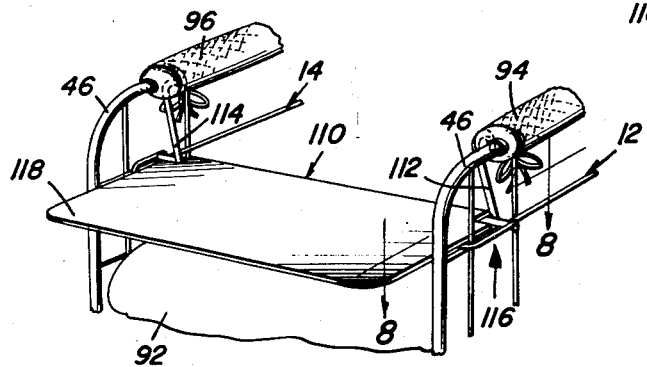

March 31, 1964  M. P. HUBBARD  3,127,215
INFANT'S SEAT AND BED

Filed Oct. 31, 1961  4 Sheets-Sheet 3

Mattie P. Hubbard
INVENTOR.

BY *Clarence A. O'Brien*
*and Harvey B. Jacobson*
Attorneys

March 31, 1964   M. P. HUBBARD   3,127,215
INFANT'S SEAT AND BED
Filed Oct. 31, 1961   4 Sheets-Sheet 4

Mattie P. Hubbard
INVENTOR.

BY *Clarence A. O'Brien*
and *Harvey B. Jackson*
Attorneys

United States Patent Office 3,127,215
Patented Mar. 31, 1964

3,127,215
INFANT'S SEAT AND BED
Mattie P. Hubbard, 205 N. Daugherty, Eastland, Tex.
Filed Oct. 31, 1961, Ser. No. 148,915
9 Claims. (Cl. 297—118)

This invention relates to a novel and useful infant's seat and bed and is primarily concerned with providing a structure of the convertible type which may alternately be used by an infant or baby as a chair, a feeding chair, a bed and a training seat. The infant's seat and bed of the instant invention is for the most part constructed of various sections of wire framework in order to reduce the cost of manufacture and also to reduce the weight thereof.

In addition to the above uses, the infant's seat and bed may be used as a car seat when provided with generally inverted J-shaped car seat supporting brackets and accordingly, it may be seen that the infant's seat and bed of the instant invention has been designed in a manner whereby a single structure is capable of supporting an infant or a small baby during transportation in a vehicle, while disposed in any desired location within a home during periods in which the baby or infant is being fed, while the baby or infant is taking a nap or is asleep for the night and during the time the baby or infant is being toilet trained.

In connection with the last mentioned use, inasmuch as the infant's seat and bed may be utilized to support an infant or baby at substantially all other times when it is desired to have the baby or infant confined, during the process of toilet training the baby or infant is fully accustomed to the training seat and therefore is not placed ill at ease during the toilet training process. In this manner, the infant's seat and bed of the instant invention will greatly assist in toilet training a baby.

The main object of this invention is to provide an infant's seat and bed which may be readily transported from one location to another and used in substantially all instances, other than as a substitute for a playpen or the like, when it is desired to confine a baby or infant for a specific purpose.

A further object of this invention, in accordance with the immediately preceding object, is to provide an infant's seat and bed which will present a pleasing appearance.

Still another object of this invention is to provide a device in accordance with the preceding objects which may be stored in a relatively compact state.

A final object to be specifically enumerated herein is to provide a device in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a vertical sectional view taken substantially upon the plane indicated by the section line 2—2 of FIGURE 1;

FIGURE 7 is a fragmentary perspective view of the infant's seat and bed similar to that of FIGURE 1 but showing the adjustable shelf member disposed in the upper tray defining position as compared to the foot rest defining position illustrated in FIGURES 1 and 2;

FIGURE 8 is a fragmentary horizontal sectional view on a somewhat enlarged scale taken substantially upon the plane indicated by the section line 8—8 of FIGURE 7;

Figure 1:
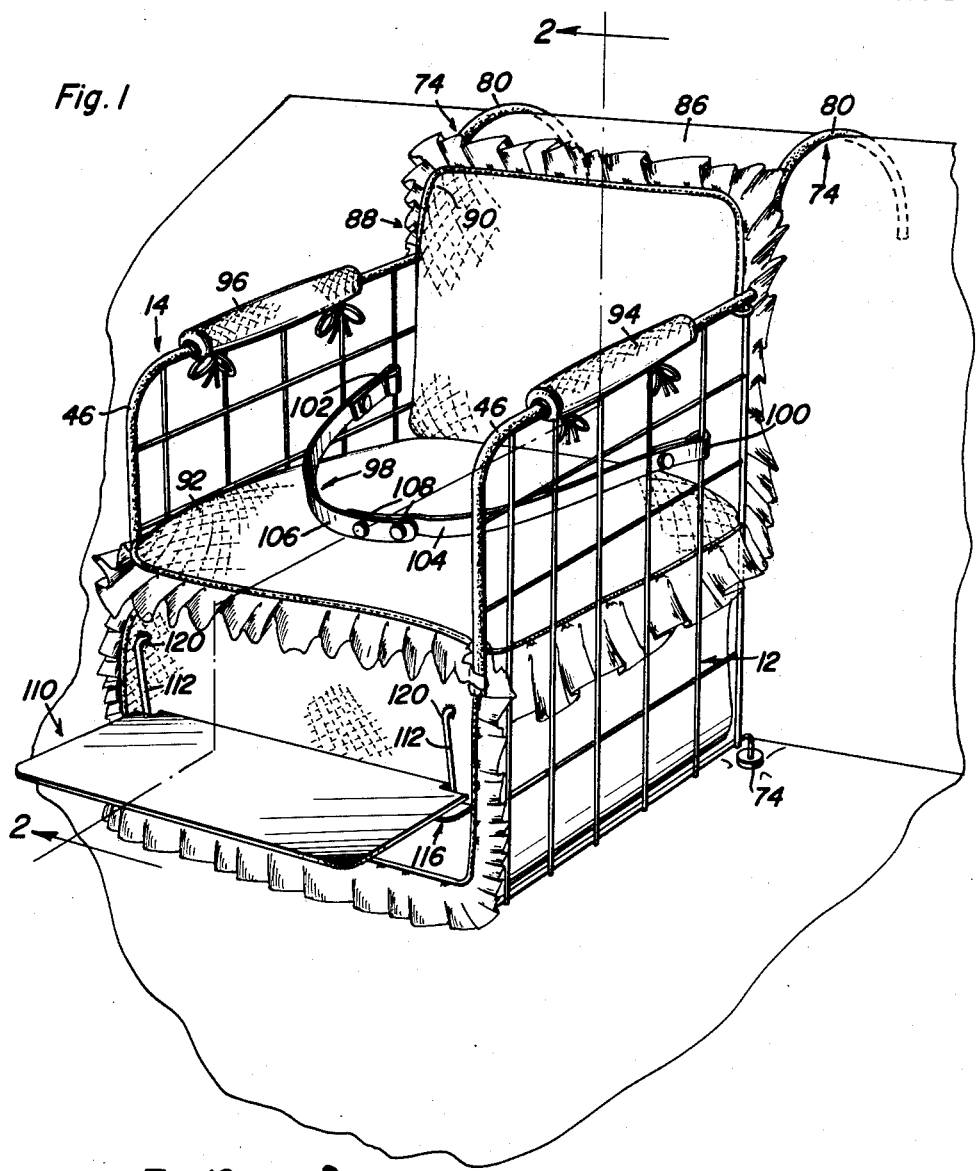
FIGURE 1 is a perspective view of the infant's seat and bed shown supported from a vehicle seat.

Referring now specifically to the drawings, the numeral 10 generally designates the chair seat of the instant invention.

The infant's seat and bed includes a pair of upstanding opposite sides generally referred to by the reference numerals 12 and 14 which are interconnected at their rear upstanding edge portions by means of a back generally referred to by the reference numeral 16 and at their forward edge portions by means of suitable transverse bracing means generally referred to by the numeral 18.

A horizontally disposed main seat generally referred to by the reference numeral 20 is secured between the back and opposite sides and is spaced from the upper and lower ends of the sides 12 and 14. A horizontally disposed false seat generally referred to by the reference numeral 22 is of a width adapted to be received between the sides 12 and 14 and is normally disposed in overlying engagement with the main seat 20 and is supported by the latter.

A lower shelf generally referred to by the reference numeral 24 is secured between the opposite sides 12 and 14 and is spaced below the main seat 20 to define a storage space 26 between the shelf 24 and the main seat 20. The space 26 may be utilized to support an open top receptacle such as that illustrated in FIGURE 2 of the drawings and generally referred to by the reference numeral 28 and which in turn may be utilized to store a pot generally referred to by the reference numeral 30. It is to be understood that other equipment such as diapers, bottles and materials for preparing formulas may be stored in the receptacle 28.

Figure 4:
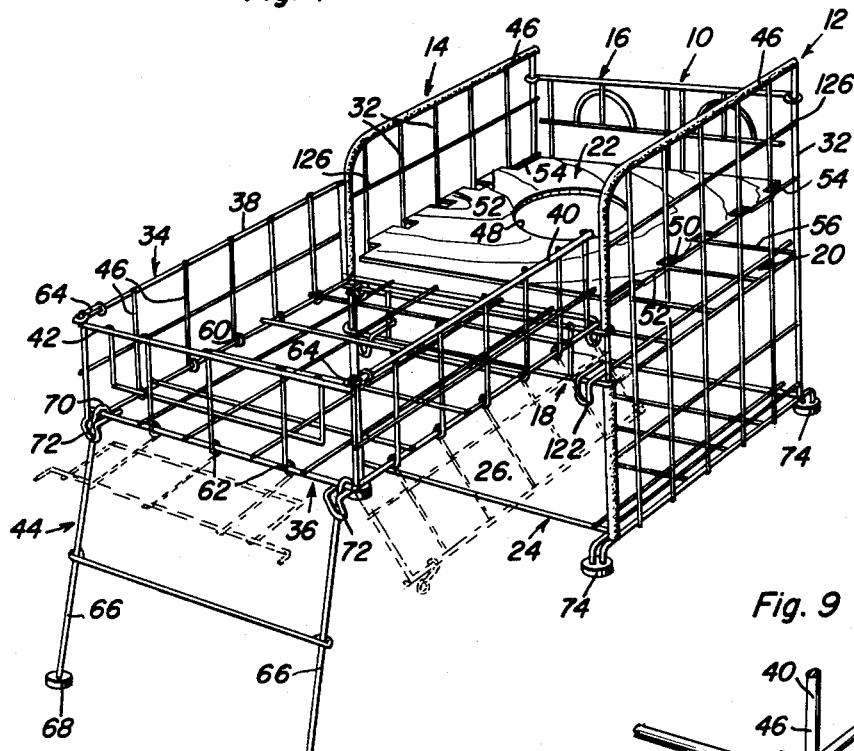
FIGURE 4 is a perspective view similar to that of FIGURE 3 but showing the seat extension assembly operatively connected thereto.
Figure 9:
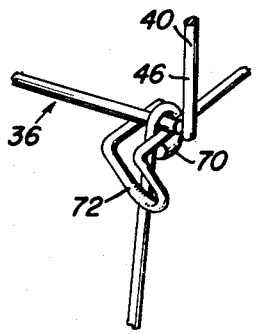
FIGURE 9 is a fragmentary enlarged perspective view of the free end of the manner in which the depending leg assembly is pivotally secured thereto.

It will be observed from FIGURE 4 of the drawings that all but the false seat 22 previously hereinbefore set forth components of the infant's seat and bed are constructed of open grillwork composed of a plurality of interconnected small diameter rod-like members 32. For convenience sake the rod members 32 may be secured to each other by welding.

In addition to the previously described seat proper, the infant's seat and bed also includes a seat extension assembly generally referred to by the reference numeral 34. The seat extension assembly 34 comprises elongated bottom generally referred to by the reference numeral 36, a plurality of opposite side walls 38 and 40, and end wall 42 and a depending leg assembly generally referred to by the reference numeral 44.

To top and upper forward edges of the sides 12 and 14 each have a suitable resilient covering 46 disposed thereover and it will be noted that the rod-like members 32 of the sides 12 and 14 include a plurality of generally parallel upstanding members which are interconnected by means of a plurality of generally parallel horizontal members. The false seat 32 has a vertically extending and generally centrally disposed openings 48 formed therein and notches 50 which open outwardly from and are spaced longitudinally along opposite sides of the false seat 22. The notches 50 each receives one of the upright or vertically disposed rod-like members 32 of the corresponding side and the projections 52 defined by the notches 50 are received between adjacent corresponding ones of the vertical rod-like members 32 above the horizontal rod-like members 54 of the sides 12 and 14. In this manner, the false seat 22 is supported in a position elevated above the main seat 20 and defines a receptacle receiving shelf 56 between the main and false seats 20 and 22. The pot 30 may be disposed on the receptacle receiving shelf 56 below the false seat 22 and may be vertically aligned with the opening 48 formed in the false seat 22. In this manner, the seat and bed 10 may be utilized as a training seat.

When it is not desired to use the infant's seat and bed as a training seat, the false seat is supported directly by the main seat 20 as shown in FIGURE 2 of the drawings.

Each of the transverse rod-like members 32 of the side walls 38 and 40 terminate at their lower ends in backturned portions 60 which at least partially encircle the corresponding longitudinally extending rod-like member 46 of the elongated bottom 36. In addition, each of the lower ends of the transverse rod-like members 46 of the end wall 42 terminates in a backturned end portion 62 which at least partially encircles the outer end transverse rod-like member 46 carried by the elongated bottom 36. In this manner, each of the opposite side walls 38 and 40 and the end wall 42 is pivotally secured to the corresponding end edge portion of the elongated bottom 36 for movement about an axis extending along that edge portion.

A pair of fasteners 64 are carried by the upper longitudinal rod-like members 46 of the opposite side walls 38 and 40 and are releasably engageable with the endmost transverse rod-like members 46 carried by the end wall 42 to retain the opposite side walls 38 and 40 and the end wall 42 in upstanding position such as that illustrated in FIGURE 4 of the drawings.

Figure 6:
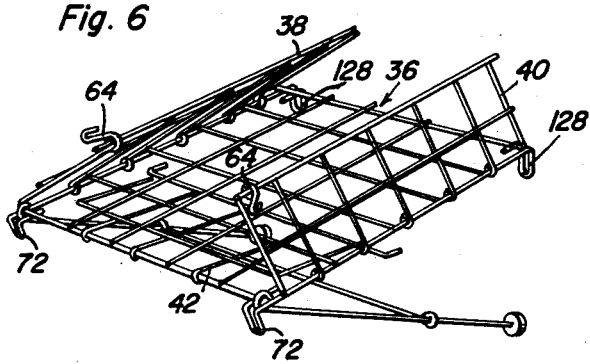
FIGURE 6 is a perspective view of the seat extension assembly shown in a folded position.

The depending leg assembly 44 includes a pair of legs 66 and each is provided with a foot member 68 on its lower end and a backturned end portion 70 on its upper end which rotatably receives the transverse rod-like member 46 carried by the outer end of the elongated bottom 36. Accordingly, the depending leg assembly 44 may be pivoted from the position such as that illustrated in FIGURE 4 of the drawings defined by limit stops 72 to and beyond the position illustrated in FIGURE 6.

Figure 10:
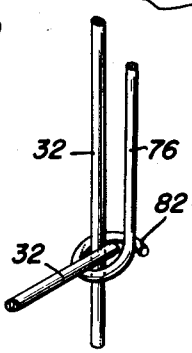
FIGURE 10 is a fragmentary perspective view on somewhat of an enlarged scale of one side of the rear portion of the infant's seat showing the manner in which the inverted J-shaped support arms are removably secured to the infant's seat.
Figure 3:
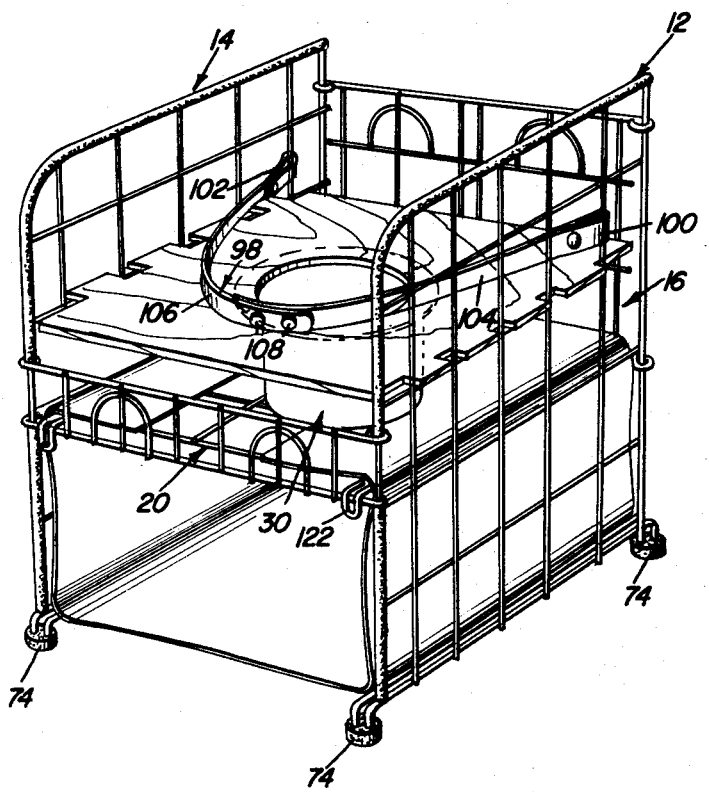
FIGURE 3 is a perspective view of the infant's seat similar to that of FIGURE 1 but showing the seat, back and side cushions removed.
Figure 5:
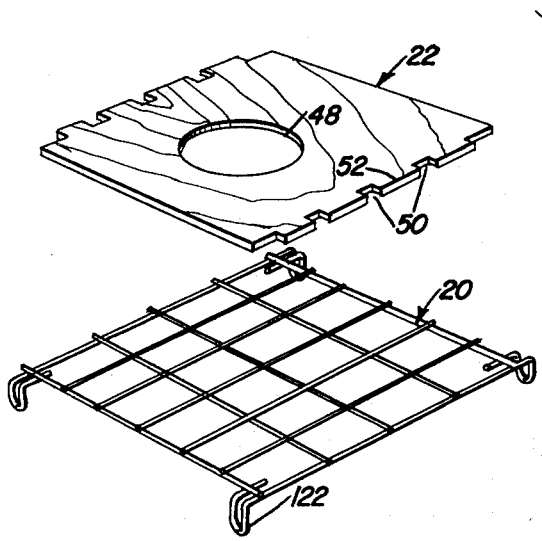
FIGURE 5 is an exploded perspective view of the main and false seats of the infant's seat.

With attention now directed to FIGURES 2 and 10 of the drawings it will be seen that a pair of generally inverted J-shaped support arms referred to in general by the reference numeral 74 are provided and that each includes a long leg 76 and a short leg 78 which are interconnected at their upper ends by means of a curved bight portion 80. The lower end of the long legs 76 each terminates in eye portions 82 which may be releasably engaged with the inner section of a pair of crossed rod-like members 32 at the opposite sides 12 and 14. The curved bight portion 80 of each support arm 74 has a resilient covering 84 disposed thereover and it will be noted from FIGURE 1 of the drawings that the J-shaped support arms may be engaged over the top of a vehicle seat back rest 86.

With attention now directed to FIGURES 1 and 2 of the drawings it will be seen that a cushion assembly generally referred to by the reference numeral 88 is provided and includes a back rest portion 90 and a seat portion 92. The seat portion 92 is adapted to overlie the false seat 22 and the back portion 90 rests against the back 16 of the seat 10. Further, armrest cushions 94 and 96 are secured to the upper ends of the sides 12 and 14. Still further, a strap member generally referred to by the reference numeral 98 may have its opposite end portions 100 and 102 secured to the sides 12 and 14 respectively. In addition, it will be noted that the strap member 98 includes a pair of strap sections 104 and 106 which are joined at adjacent ends by means of snap fasteners 108.

With attention now directed to FIGURES 1, 2, 7 and 8 there will be seen an adjustable shelf member generally referred to by the reference numeral 110. The shelf member 110 includes a pair of generally L-shaped arms 112 and 114 which are interconnected by means of a suitable open framework generally referred to by the reference numeral 116 that is covered by means of a panel-like member 118.

The upper ends of the L-shaped arms 114 are provided with backturned end portions 120 which may be releasably engaged with the upper end of the transverse bracing means 18 or with the mounting loops 122 carried by the forwardmost edge portion of the main seat 20. The rear edge of the panel-like member 118 and the rearmost rod-like member 124 of the framework 116 engage the transverse brace means 18 and the forward end edges of the sides 12 and 14 respectively when the adjustable shelf member 110 is positioned as illustrated in FIGURES 1 and 2.

However, the adjustable shelf member 110 may also be positioned as illustrated in FIGURE 7 of the drawings and it will be noted that the opposite ends of the framework 116 extend outwardly beyond the opposite edges of the panel-like member 118. In this manner, the opposite ends of the framework 116 may be engaged with the horizontal rod-like members 126 of the rod-like members 32 which are disposed immediately above the rod-like members 54. As can be seen from FIGURES 7 and 8 of the drawings when the adjustable shelf member 110 is disposed in this position it will serve as a food tray and the like.

It will be noted that the end of the elongated seat extension assembly 34 remote from the depending leg assembly 44 is provided with downturned hooks 128 for engagement with the transverse brace means or frame 18 which is secured between the forward ends of the sides 12 and 14. In this manner, the end of the seat extension assembly 34 adjacent the sides 12 and 14 may be removably supported at the desired elevation.

Accordingly, it may be seen that herein described is an infant's seat and bed which may be conveniently utilized to properly position and confine an infant or baby in substantially all instances other than when it is desired to place the baby in a playpen area or the like. The infant's seat and bed may be used for transporting the baby, toilet training the baby, feeding the baby, napping the baby and merely as a chair seat for the baby.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An infant's seat and bed comprising a pair of upstanding opposite sides interconnected at their rear edge portions by means of an upstanding back and at their forward edge portions by means of suitable bracing means, a horizontally disposed main seat secured between said back and opposite sides spaced from the upper and lower ends of said sides, a horizontally disposed false seat receivable between said sides for support above and by said main seat, said sides being grill-like in nature and including crossed and interconnected generally parallel vertical members and generally parallel horizontal members and said false seat including a plurality of longitudinally spaced notches in each side edge thereof in which the corresponding vertical members are receivable in alternately vertically spaced positions of said false seat above said main seat with the projections of said false seat defined between adjacent notches resting upon corresponding ones of said horizontal members whereby said seat may be alternatively supported in a position spaced above said main seat and defining a receptacle receiving shelf between said main and false seats, said false seat having a large opening formed therethrough with which a pot disposed between said main and false seats on said shelf may be registered.

2. The combination of claim 1 including a lower shelf secured between said opposite sides and spaced below said main seat a distance sufficient to define a storage space between said shelf and main seat adapted to receive a pot when said infant's seat is not being used as a training chair or seat.

3. The combination of claim 1 including generally inverted J-shaped arms each including a short arm and a long arm interconnected at adjacent ends by means of a bight portion, the free end portion of said long arms being receivable in the upright corners defined by said sides and back and including means at their lower ends releasably engageable with a portion of said seat and bed adjacent the juncture of said back and one of said sides to prevent vertical withdrawal of said long arms from said corners.

4. The combination of claim 1 wherein the upper ends of said sides are disposed a distance above said main seat defining sides for said infant's seat when a baby is being supported from a level adjacent said main seat and arm rests when a baby is being supported from a level adjacent said false seat when the latter is positioned to define said receptacle receiving shelf.

5. The combination of claim 1 including an adjustable shelf member, said shelf member and opposite sides including coacting means for removably supporting said shelf member alternately in a horizontal first lower foot rest position disposed below said main seat and projecting forwardly of said sides and a second horizontal upper tray defining position disposed above said main seat and projecting rearwardly of the forward edges of said sides.

6. The combination of claim 1 including a seat extension assembly comprising an elongated bottom, means on one end for removable securement to the front of said infant's seat in substantial horizontal alignment with said false seat, and a depending leg assembly carried by the other end of said elongated bottom adapted to support said other end in substantial horizontal alignment with said one end.

7. The combination of claim 6 wherein said elongated bottom is of a width corresponding to the width of said infant's seat and includes upstanding longitudinally extending side walls, an upstanding end wall carried by said other end and disposed between said side walls, said side walls and end wall being pivotally secured at their lower edge portions to said bottom wall for rotation about axes extending along opposite sides and said other end of said bottom wall respectively, means removably securing the opposite ends of the upper edge of said end wall to the corresponding side wall.

8. The combination of claim 7 wherein said leg assembly is pivotally secured to said other end of said bottom wall for movement about an axis extending along said other end of said bottom wall.

9. The combination of claim 2, including generally inverted J-shaped arms each including a short arm and a long arm interconnected at adjacent ends by means of a bight portion, the free end portion of said long arms being receivable in the upright corners defined by said sides and back and including means at their lower ends releasably engageable with a portion of said seat and bed adjacent the juncture of said back and one of said sides to prevent vertical withdrawal of said long arms from said corners.

References Cited in the file of this patent

UNITED STATES PATENTS

| 180,775 | McGill | Aug. 8, 1876 |
| 251,248 | Klett | Dec. 20, 1881 |
| 902,449 | Price | Oct. 27, 1908 |
| 1,022,767 | Beistle | Apr. 9, 1912 |
| 1,330,204 | McDevitt | Feb. 10, 1920 |
| 1,388,895 | Russo | Aug. 30, 1921 |
| 2,550,811 | Herbert | May 1, 1951 |
| 2,799,322 | Jordan | July 16, 1957 |

FOREIGN PATENTS

| 484,694 | France | Aug. 7, 1917 |
| 1,216,060 | France | Nov. 23, 1959 |